May 30, 1967     W. R. CLENDINNING ETAL     3,322,979
THERMIONIC ENERGY CONVERTER

Filed March 31, 1964     2 Sheets-Sheet 1

INVENTORS
William R. Clendinning
Foster L. Gray
BY
E. Mickey Hubbard
Attorney

United States Patent Office 3,322,979
Patented May 30, 1967

3,322,979
THERMIONIC ENERGY CONVERTER
William R. Clendinning and Foster L. Gray, both of Dallas, Tex., assignors to Texas Instruments Incorporated, Dallas, Tex., a corporation of Delaware
Filed Mar. 31, 1964, Ser. No. 358,971
3 Claims. (Cl. 310—4)

The present invention relates to thermionic energy converters, and more particularly, but not by way of limitation, relates to a thermionic diode suitable for use directly in a fossil-fuel-flame and to a process for manufacturing same.

In general, a thermionic diode used to generate electric power from heat is comprised of an emitter material having a relatively high thermionic work function, and a collector material having a relatively low thermionic work function. The collector is disposed close to, but not in contact with, the emitter and the space between the two is evacuated or filled with a gas such as cesium having a low ionization potential. When the emitter is heated, electrons flow across the gap from the emitter to the collector. Use of thermionic diodes has heretofore been limited, as a practical matter, to systems wherein the emitter can be heated in a controlled inert atmosphere or in a space environment in which there is no atmosphere. Otherwise, when the emitters are heated to efficient operating temperatures, the refractory metals required for the high temperatures corrode or oxidize and the diode fails. In particular, prior diodes cannot be heated directly in a fossil-fuel-flame because the refractory metals quickly fail due to oxidation. However, when exposed directly in a flame, hydrogen and other gases tend to permeate through the emitter material into the diode space at a relatively high rate and thereby quickly reduce the efficiency of the diode due to contamination of the evacuated space.

The present invention contemplates an improved thermionic diode construction which may be employed directly in a fossil-fuel-flame, or in other corrosive environments. The novel thermionic diode utilizes an emitter member comprised of a coating of substantially fluid-impervious silicon carbide on one surface of an emitter material to protect the emitter material from oxidation, or other corrosion, and from hydrogen or other gas permeation. The silicon carbide has good heat transfer characteristics and when bonded to the surface of the emitter material provides a good heat transfer path to the emitter and also seals the surface to form a corrosion and gas permeation barrier.

In accordance with one specific aspect of the invention, the emitter member is comprised of an emitter material, such as tungsten or other refractory metal, and a coat of silicon carbide vapor-deposited and bonded to one surface of the emitter material. A collector member, such as nickel, is then disposed in spaced relationship adjacent a surface of the emitter material which is not coated and the atmosphere in the space between the two is evacuated or otherwise controlled to complete the structure.

In accordance with another aspect of the present invention, the silicon carbide is formed as a body having structural integrity and the emitter material is vapor-deposited or otherwise formed as a film on one surface of the silicon carbide body. The collector member may then be positioned adjacent the free surface of the emitter material and the space between the two sealed off to complete the construction.

In accordance with still another aspect of the present invention, a compatible material such as graphite is used as a structural support body. A coat of silicon carbide is vapor-deposited and bonded to one surface of the graphite and an emitter material, such as tungsten, is vapor-deposited and bonded to another, generally opposite surface. A collector member and seal then completes the structure.

In accordance with still another aspect of the invention, the silicon carbide is formed as a sleeve having structural integrity, the refractory metal emitter is similarly formed as a sleeve having structural integrity, and the two sleeves are telescoped and bonded with a suitable brazing material. A collector member may then be positioned adjacent the free surface of emitter material and the space sealed to complete the construction.

Another object of the present invention is to provide a thermionic diode having a relatively long service life.

Another object of the present invention is to provide a thermionic diode of the type described which is protected from hydrogen or other gas permeation when heated by a flame, nuclear, or solar heat storage source.

Many additional objects and advantages of this invention will be evident to those skilled in the art from the following detailed description and drawings, wherein.

Figure 1:
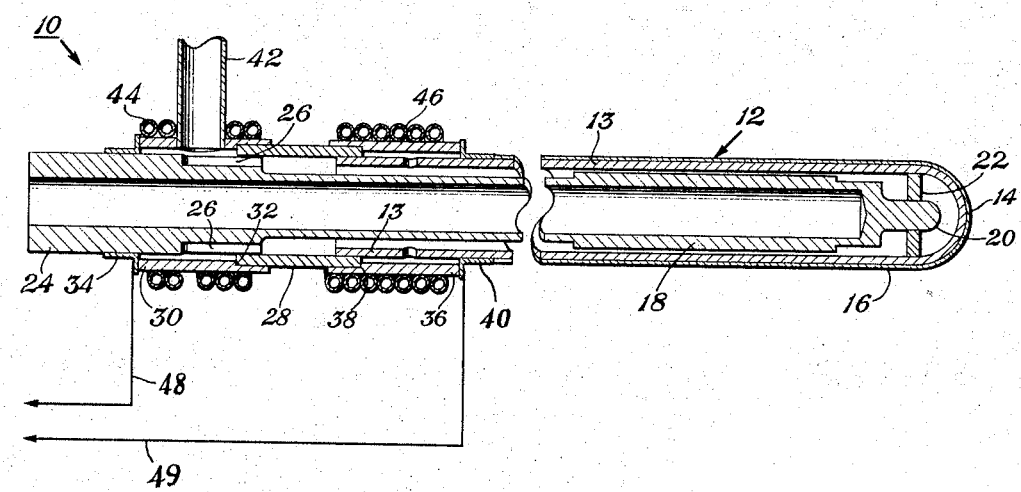
FIGURE 1 is a longitudinal sectional view of a thermionic diode constructed in accordance with the present invention.

Referring now to the drawings, and in particular to FIGURE 1, a thermionic diode constructed in accordance with the present invention is indicated generally by the reference numeral 10. The diode includes a tubular emitter member which is comprised of a sleeve 13 of emitter material, preferably tungsten or other high temperature metal, commonly referred to as refractory metals, having a relatively high thermionic work function. The sleeve 13 has structural integrity and therefore has sufficient strength to withstand handling during the fabrication and use of the diode. The sleeve 13 may have a closed end and has cylindrical inner and outer surfaces. A coat of dense silicon carbide 16 is intimately bonded to the outer surface of the sleeve 13 by a vapor deposition process which will presently be described in greater detail. The silicon carbide coating 16 is highly resistant to corrosion at elevated temperatures, is dense and substantially fluid-impervious to provide a corrosion and gas permeation barrier for the sleeve 13 and can be thermally cycled between low and high temperatures without spalling from the surface of the sleeve 13 or suffering other adverse effects.

A collector member 18 is disposed within the emitter member 12. The collector member 18 may be fabricated from, or the surface coated with nickel or other suitable collector material having a thermionic work function lower than the thermionic work function of the emitter material of the sleeve 13. The collector member 18 is also tubular and has an external diameter only slightly less than the internal diameter of the emitter sleeve 13 so as to provide a minimum clearance between the mating surface of the two members without contact. The collector member 18 has a probe portion 20 which is received within a ceramic insulating washer 22 to maintain the right-hand end, when referring to FIGURE 1, of the collector member 18 centered within the sleeve 13. The left-hand end of the collector member is centered relative to the sleeve 13 by a series of collars which will presently be described.

The other end of the collector member 18 has an enlarged portion 24 which is provided with two or more longitudinally-extending grooves 26. A ceramic insulating collar 28 is telescoped over the enlarged portion 24 and over the grooves 26. A first metal collar 30 having an annular shoulder 32 is then telescoped over one end of the ceramic insulating collar 28 until the shoulder 32 abuts against the end of the collar 28. A flanged sleeve 34 is then bonded to the enlarged portion 24 of the collector member 18 and to the collar 30 by brazing or other suitable technique to provide a fluid-tight seal. The open end of the emitter sleeve 13 is received in the other end of ceramic insulating collar 28. A second metal collar 36 having an annular shoulder 38 is then telescoped over the ceramic collar 28 until the shoulder 38 abuts against the end of the collar 28. The metal collar 36 is connected to the sleeve 13 by a second flanged sleeve 40 which may be brazed or otherwise connected to the two members to form a fluid-tight connection. The joints between the ceramic insulator collar 28 and the metal collars 30 and 36 are also fluid-tight so that the space between the collector member and emitter member will be sealed from the atmosphere.

The collar 30 is provided with a conduit 42 which provides a means for evacuating the space between the emitter member 12 and the collector member 18. The space may then be backfilled with cesium or other suitable gas to the desired pressure and the space sealed to provide a controlled atmosphere.

Cooling coils 44 and 46 may be disposed around the collars 30 and 36 for cooling the end of the diode during operation. The collector member 18 may also be cooled by a suitable cooling fluid circulated through the interior of the member.

The thermionic diode 10 may be operated merely by disposing the silicon carbide coated emitter member 12 directly in a fossil-fuel-flame or other heat source. The close spacing between the surface of the emitter sleeve 13 and the surface of the collector member 18 filled with the cesium gas results in a current flow in the conventional manner. Suitable electric leads 48 and 49 may be connected to the metal collars 30 and 36, respectively, to provide electrical contact with the collector member 18 and the emitter member 12, respectively. The thermionic diode may be mounted in any suitable manner, such as, for example, by projecting the emitter member 12 through an aperture in the wall of a combustion chamber. The silicon carbide has a high thermal conductance and the intimate bond with the emitter sleeve 13 provides efficient heat transfer to the emitter sleeve 13. On the other hand, the collector member 18 is maintained at a much lower temperature by the cooling fluid in order to establish the necessary temperature gradient. The cooling coils 44 and 46 prevent the conduction of heat from the emitter member 12 through the collars 36, 28 and 30 to the collector member 18. The silicon carbide coat protects all portions of the refractory metal which is heated and exposed to the atmosphere.

An important aspect of the present invention concerns the novel process for manufacturing the emitter member 12. In accordance with its broader aspects, the emitter sleeve 13 may be fabricated in such a manner that the interior emitter surface is formed by any suitable emitter material having the desired work function which will withstand the necessary high temperatures, and to which a protective coat of silicon carbide may be bonded. In accordance with a more specific aspect of the present invention, the emitter sleeve 13 is fabricated from a refractory metal, and preferably is fabricated from a body of tungsten having structural integrity, and the silicon carbide coat 16 is applied using the method described in copending U. S. application entitled "Process for Applying a Protective Coat of Silicon Carbide to Refractory Metals," SN 356,190, filed by W. R. Clendinning on Mar. 31, 1964.

In its broader aspects, the invention entails the pretreatment of the refractory metal to prevent the formation of a metal silicide during the initial stages of the silicon carbide deposition process. More specifically, the outer surface of the refractory metal may be carburized by some conventional carburizing processes, such as for example, one of the processes described in Materials and Techniques for Electron Tubes, page 288, by Walter H. Kohl, published by Reinhold. The process is particularly adapted for coating tungsten which in turn is particularly suited for use as a thermionic emitter material.

In one such process, the tungsten sleeve is sandblasted to rough and clean the surface, then vapor de-greased with trichloroethylene. The sleeve is then transferred to a controlled atmosphere reaction chamber using clean handling techniques. The chamber is purged with an inert gas such as helium or argon. The sleeve is then heated to a temperature in the range from about 1200° C. to about 1900° C. by any suitable means, such as, for example, by electrical resistive heating, electrical inductive heating, or radiant heating. A gas process stream comprised of hydrogen and the vapors of a carbon compound are then introduced to the reaction chamber. For example, a process stream comprised of about 0.42 gram of benzene per liter of hydrogen may be formed by passing hydrogen through liquid benzene. However, as is well-known, many other carbon compounds may be used to carburize the surface of refractory metals. The sleeve is maintained at the elevated temperature for from about 0.5 minute to about 10 minutes, depending upon the temperature. For example, if the temperature of the sleeve is about 1200° C., the carburizing process may be carried out for a period of from about 5 to 10 minutes. On the other hand, a temperature of about 1900° C. need be maintained for only about 0.5 minute.

After the surface of the emitter has been carburized or otherwise prepared in such a manner as to prevent the formation of a metal silicide, the emitter is then coated with the silicon carbide 16 by a suitable process such as that described in application SN 68,767, titled "Novel Vapor Deposition Process and Product," filed by William A. Santini, Jr., on Nov. 14, 1960. In this process, a gaseous stream containing hydrogen, silicon and carbon in appropriate ratios is introduced into the controlled atmosphere reaction chamber in which the heated emitter sleeve is located. The carrier gas of the process stream is hydrogen and the flow conditions and geometry of the reaction chamber are chosen with reference to the heated sleeve such that as the process stream flows by the sleeve, a relatively thin quiescent zone is established at the surface. A relatively high rate of diffusion occurs to produce the rapid codeposition of silicon and carbon atoms on the surface of the heated emitter sleeve. The proportion of atoms of silicon and carbon that are deposited can be controlled to yield a material which is substantially stoichiometric silicon carbide, or may be silicon carbide having either carbon or silicon atoms as a second phase. The process provides a diffusion controlled, surface catalyzed reaction in which molecules of the reactants move across the relatively thin quiescent zone established adjacent the surface of the heated emitter sleeve by virtue of a relatively high diffusion gradient. The molecules, upon reaching the surface of the substrate, are degraded to yield free silicon and carbon atoms which subsequently react to form a coat of silicon carbide. In the reaction, hydrogen favors the formation of silicon atoms and this can be employed to control the proportion of silicon and carbon atoms formed.

More specifically, methylthichlorosilane may be used to supply both the silicon and carbon atoms in the hydrogen carrier gas. Thus after the surface of the refractory metal sleeve 13 has been carburized, the temperature of the sleeve is reduced to a temperature in the range from about 900° C. to about 1500° C. While maintaining the sleeve 13 uniformly at the selected temperature, hydrogen may be passed through a vessel containing methyltrichlorosilane to entrain vapors of the carbon-silicon compound, then mixed with pure hydrogen to control the concentration, then passed through the reaction chamber adjacent the heated sleeve in such a manner as to provide the relatively thin quiescent zone. The mol ratio of the hydrogen to the methyltrichlorosilane should be from about 50:1 to about 4:1, and the mol ratios may be determined by a thermal conductivity cell. The flow rate of the process stream may be monitored by suitable flow meters and controlled by an appropriate valve. The temperature of the heated sleeve may be monitored by a suitable heat sensing means such as an optical pyrometer and the temperature of the substrate automatically controlled in response thereto if desired. The process stream should be directed by a nozzle into the reaction chamber in such a manner as to insure that the quiescent zone adjacent the surface of the member is relatively thin. This will insure that the diffusion rate will be relatively high so that the carbon and silicon atoms will be deposited on the surface at a sufficiently high rate to produce a dense, bulk coat of beta silicon carbide which is essentially fluid-impervious. If the deposition rate is too low, a coat of large silicon carbide crystals which is not fluid-impervious may be formed. As the process is carried out, a substantially uniform coat of silicon carbide is formed over the entire surface of the tungsten sleeve 13 by the mechanism previously explained in which the methyltrichlorosilane is decomposed to produce free atoms of silicon and carbon at the surface of the substrate by virtue of a diffusion controlled, surface catalyzed reaction. Since the surface of the tungsten sleeve has previously been carburized, the free silicon initially deposited on the surface will not form tungsten silicide which, it is believed, if formed, would tend to cause the silicon carbide to spall off.

In order to afford a better understanding of the silicon carbide coating, specific properties of silicon carbide coatings produced by the present process will now be presented. A relatively wide range of process variables including the mol ratios, process stream flow rate and therefore flow velocities, temperature of the substrate, and duration of the run will vary the thickness and physical and chemical properties of the silicon carbide coat within the following ranges. Runs have been conducted using hydrogen flow rates of 20 liters per minute to 100 liters per minute depending upon the system. Duration of the runs have been varied from 0.05 to 8.7 hours at temperatures from 1180° C. to 1450° C. Silicon carbide coatings having thicknesses from 3 to 115 mils have been produced. The silicon carbide coatings have beta crystalline structure, are very dense and, most important of all, are essentially fluid-imprevious. The silicon carbide coatings may range from stoichimetrically pure silicon carbide to silicon carbide having as much as 0.89% carbon or as much as 36.5% free silicon as a second phase element, depending upon the excess materials present and the amount. The compressive strength of the materials produced by the process ranges from about $31 \times 10^3$ to about $55 \times 10^3$ p.s.i. The modulus of elasticity ranges from about $45 \times 10^6$ to about $50 \times 10^6$ p.s.i. The coefficient of thermal expansion ranges from about $4.0 \times 10^{-6}$ to about $5.4 \times 10^{-6}$ in./in./° C. when tested in the temperature range of 30° C. to 810° C. The Knoop hardness of the material, determined by utilizing a 1000 gram load, ranges from about 988 to about 2900. The resistivity of the material ranges from 0.05 to about 4 ohm-centimeters. The density determined on a water displacement basis ranges from 2.59 to 3.28 grams/cc. No adverse thermal shock effects resulted when silicon carbide at 1000° C. was plunged into water at room temperature.

Although methyltrichlorosilane was specified in the above described example, various other materials can be employed to furnish the silicon and carbon. For example, the silicon carbide source may be single compounds, such as dimethyldichlorosilane, trimethylchlorosilane, tetramethylsilane and other aliphatic and aromatic substituted halogenated silanes. Also, the silicon atoms and carbon atoms may be supplied in separate compounds. For example, the carbon atoms may be supplied by compounds such as methane, ethane, propane, benzene, toluene, xylene, ethylene, propylene, and other aliphatic and aromatic hydrocarbons, and the silicon atoms may be supplied by compounds, for example, such as silicon tetrachloride, silicon tetrabromide, silicon tetraiodide, or any one or more of mono-, di-, and tri- chloro-, bromo- and iodo-silane.

In accordance with another important aspect of the present invention, the emitter surface is fabricated from vapor-deposited or epitaxially grown tungsten which is essentially single crystal or at least oriented poly-crystals so as to improve the emission characteristics of the emitter. The tungsten can be vapor-deposited into complex shapes and massive tungsten can be produced by decomposition of tungsten carbonyl, by hydrogen reduction of tungsten hexachloride or tungsten hexafluoride. More specifically, the present invention contemplates vapor-depositing or otherwise forming tungsten on a cylindrical rod, such as graphite, carburizing or otherwise preconditioning the surface of the deposited tungsten, then depositing silicon carbide on the prepared surface of the tungsten by the process heretofore described. The graphite cylinder may then be removed by machining, etching, or other suitable technique, to produce the emitter member 12 including tungsten emitter sleeve 13 and coat of silicon carbide 16. A collector member, such as the collector member 18, may then be inserted in the tungsten emitter surface and the space sealed by any suitable means to control the atmosphere.

Figure 2:
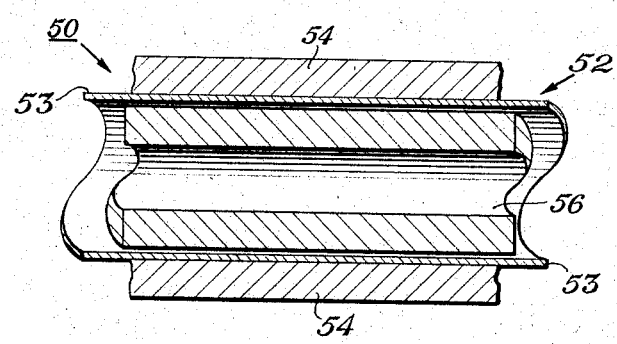
FIGURE 2 is a partial longitudinal sectional view of another thermionic diode constructed in accordance with the present invention.

Referring now to FIGURE 2, another thermionic diode constructed in accordance with the present invention is indicated generally by the reference numeral 50. The diode 50 has an emitter member indicated generally by the reference numeral 52 which may comprise a thin emitter film 53 of refractory metal, which is preferably tungsten, which has been deposited in place on the interior surface of a silicon carbide sleeve 54, and is adherently bonded thereto. The silicon carbide sleeve 54 has sufficient structural integrity to support all mechanical loads imposed thereon during fabrication and operation of the diode, and in particular has sufficient structural integrity to support the deposited emitter film 53. A collector member 56 is disposed within the emitter film 53 and as previously described has a surface fabricated of a collector material having a thermionic work function lower than that of the emitter film 53. For example, if the emitter film 53 is tungsten, as in the preferred case, the collector member 56 might have a nickel surface. Although only a portion of the thermionic diode 50 is illustrated, it is to be understood that suitable sealing means would be included to control the atmosphere between the emitter member and collector member and that suitable electrical terminals would be employed, similar to, for example, the corresponding components of the thermionic diode 10 illustrated in FIGURE 1.

In accordance with another important aspect of the present invention, the emitter member 52 of the thermionic diode 50 may be fabricated using a novel process wherein the silicon carbide sleeve 54 is formed on a graphite rod or other suitable substrate using the process heretofore described. The silicon carbide can be easily deposited directly upon the graphite rod with a minimum of difficulty. Then the graphite rod is machined or burned away to leave only the silicon carbide sleeve 54. In most cases it will be desirable to machine or ream the interior surface of the sleeve 54 so as to provide a smooth cylindrical surface having close tolerances. Then the refractory metal emitter film 53, preferably tungsten, may be deposited using any suitable well-known technique such as vapor deposit, flame spray, plasma spray, or electro deposit. This permits an emitter surface of preferred crystal orientation to be formed as desired.

Figure 3:
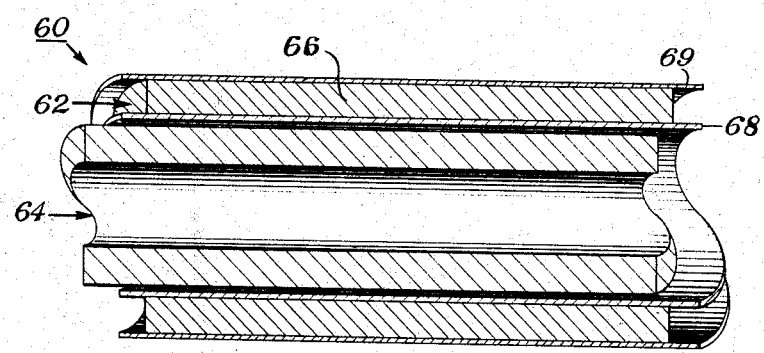
FIGURE 3 is a partial longitudinal sectional view of still another thermionic diode constructed in accordance with the present invention.

Referring now to FIGURE 3, another thermionic diode constructed in accordance with the present invention is indicated generally by the reference numeral 60. The thermionic diode 60 is comprised of an emitter member, indicated generally by the reference numeral 62, and a collector member indicated generally by the reference numeral 64. The emitter member 62 is comprised of a graphite sleeve 66 having structural integrity and inner and outer cylindrical surfaces. The interior surface of the graphite sleeve 66 is coated with an emitter film 68 of refractory metal, preferably tungsten. The exterior surface of the graphite sleeve 66 is protected by a coat 69 of silicon carbide. Again it will be appreciated that only a portion of a thermionic diode 60 is illustrated and that suitable sealing means for controlling the atmosphere between the emitter member 62 and collector member 64 and suitable electrical terminals similar to that of the thermionic diode 10 illustrated in FIGURE 1 may be employed. Operation of the diode 60 is substantially identical to the operation of the diode 10. The coat 69 of silicon carbide protects all portions of the graphite sleeve which would be raised to an oxidizing temperature and the emitter film 68 is protected by the controlled atmosphere between the members.

In accordance with another important aspect of the present invention, the emitter member of the thermionic diode 60 may be manufactured using the following process. A graphite rod may be coated with silicon carbide using the deposition process heretofore described to produce the protective coat 69. The interior of the graphite rod may be bored or otherwise machined away to produce a cylindrical interior surface onto which a suitable refractory metal may be deposited to produce the emitter film 68. For example, tungsten may be deposited from the vapor phase by using the decomposition of tungsten carbonyl, or the hydrogen reduction of tungsten hexachloride or tungsten hexafluoride. Or tungsten, or other suitable refractory metal, may be deposited on the interior surface of the sleeve 66 using any suitable conventional flame spray, plasma spray, electro deposit or vapor deposit technique. Usually if the interior surface of the carbon member 66 is machined sufficiently smooth prior to the deposition of the refractory metal, it will not be necessary to machine the interior surface of the refractory metal to produce the desired tolerances required in order to accommodate the collector member 64 and provide a uniformly close spacing between the two surfaces.

Figure 4:
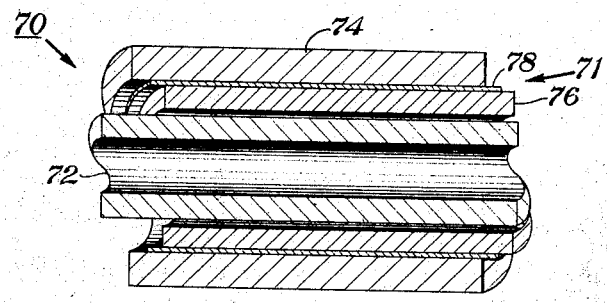
FIGURE 4 is a partial longitudinal sectional view of still another thermionic diode constructed in accordance with the present invention; and, FIGURE 5 is a partial longitudinal sectional view of yet another thermionic diode constructed in accordance with the present invention.

Referring now to FIGURE 4, another thermionic diode constructed in accordance with the present invention is indicated generally by the reference numeral 70. The thermionic diode 70 is also comprised of an emitter member, indicated generally by the reference numeral 71, and a collector member 72. The emitter member 71 is comprised of a silicon carbide sleeve 74 of sufficient thickness to have structural integrity and an emitter sleeve 76 fabricated from a suitable refractory metal, preferably tungsten. The emitter sleeve 76 is closely received within the silicon carbide sleeve 74 and is brazed therein by a suitable braze material 78, such as nickel-cobalt or other material which wets or otherwise bonds to both materials, which may be either a liquid or a solid at the high operating temperature of the diode. Again suitable sealing means (not illustrated) are provided to control the atmosphere between the emitter and collector members. The operation of the diode 70 is identical to the operation of the diode 10 and will not be explained in detail.

The thermionic diode 70 may be manufactured by the following novel process. The silicon carbide protective sleeve 74 may be manufactured by depositing a coat of silicon carbide on a graphite rod or other suitable substrate using the process previously described. Then the graphite rod is removed from the silicon carbide sleeve by machining, boring or burning. In the event the graphite rod is burned away, it may be necessary to machine the interior surface of the silicon carbide sleeve 74 to provide the necessary close tolerances. The emitter sleeve 76 is fabricated in a similar manner by depositing the tungsten or other metal on a graphite rod, or other suitable substrate, and then machining or boring the rod away. The exterior and interior surfaces of the emitter sleeve 76 may also be machined to the desired tolerances if necessary. Then the emitter sleeve 76 is inserted in the silicon carbide sleeve 74 and the braze material 78 added to bond the two sleeves together and thereby produce the desired structural rigidity and heat transfer qualities. If desired, the emitter sleeve may be machined or otherwise formed from solid stock or manufactured in any other suitable manner.

Figure 5:
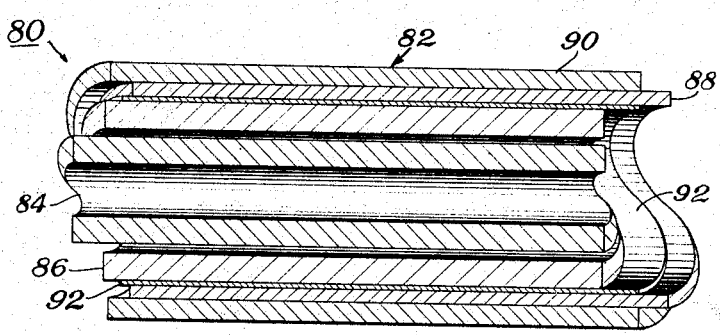

Referring now to FIGURE 5, yet another thermionic diode constructed in accordance with the present invention is indicated generally by the reference numeral 80. The thermionic diode 80 is very similar to the thermionic diode 70 and comprises an emitter member indicated generally by the reference numeral 82 and a collector member 84. The emitter member 82 is comprised of an emitter sleeve 86 which is brazed in a graphite sleeve 88 about which is disposed a silicon carbide sleeve 90 which is bonded to the graphite sleeve 88. The emitter sleeve 86 may be formed from any suitable emitter material such as one of the refractory metals, but preferably from tungsten. The emitter sleeve 86 is bonded to the graphite sleeve 88 by a suitable braze material 92, such as molybdenum-nickel-manganese, or by a diffusion bond. The protective silicon carbide sleeve 90 may be deposited and bonded on the graphite sleeve 88 using the process heretofore described to provide an integral bond. The silicon carbide sleeve 90, the graphite sleeve 88, the braze material 92 and the emitter sleeve 86 all provide a good heat conducting path for maximum efficiency. The silicon carbide sleeve 90 provides a barrier against oxidation of either the graphite sleeve 88 or the emitter sleeve 86, as well as a barrier against gas permeation of the emitter sleeve 86.

The thermionic diode 80 may be manufactured using substantially the same process as described in connection with the manufacture of the thermionic diode 70, except that after the silicon carbide sleeve 90 has been deposited on the graphite rod, the peripheral portion of the graphite rod is left during the boring operation to form the graphite sleeve 88. This, of course, automatically provides a cylindrical surface of the desired tolerance to closely receive the emitter sleeve 86. The emitter sleeve 86 may be fabricated in any suitable manner previously described and may be bonded in the graphite sleeve by the braze material or by a diffusion bond technique wherein the two sleeves are placed in intimate contact and raised to a very high temperature in a controlled atmosphere. This causes the two materials to interdiffuse and form a bond similar to a cold weld.

The permeation rates of helium and hydrogen, through thin silicon carbide coatings produced in accordance with the present invention, were measured at 1300–1500° C. using a mass spectrometer for detection. Initial thicknesses of the sample tubes varied from 80–100 mils and the test sections were ground down to 10–30 mils in thickness. The samples were outgassed in vacuum ($10^{-5}$–$10^{-6}$ torr) at temperatures up to 1650° C. Because of high internal hydrogen backgrounds in the detector and in the vacuum system, deuterium was used as the test gas and hydrogen permeation was measured as H-D. Although the detectable limit for H-D was less than $3 \times 10^{-10}$ std.-cc./sec., the usable sensitivity was nearly always less due to background interference. Based on the pessimistic assumption that all of the H-D detected resulted from permeation, permeation rates on the order of $5\times10^{-9}$ atm.-cc.-mm./cm.²-sec. were observed for hydrogen in silicon carbide at 1500° C. Similar rates were obtained for helium, again based on detector background levels.

Good agreement with literature values was obtained for H-D permeation through nickel at lower temperatures using the same techniques. The upper bound limit in silicon carbide compares favorably with similar limits of $2\times10^{-8}$ atm.-cc.-mm./cm.²-sec. given for hydrogen permeation through high density alumina at 1250° C. For a typical diode of 50 cm.² hot area, the maximum in-leakage rates due to hydrogen permeation (1 atmosphere $H_2$ pressure) would be less than $1.8\times10^{-3}$ cc./hr. for a 30 mil barrier of silicon carbide.

The silicon carbide has a high thermal conductivity of about 0.29 cal./cm. sec. ° C. This, together with a very low thermal expansion coefficient of $4.5\times10^{-6}$ ° C. gives rise to excellent thermal shock resistance. Specimens of silicon carbide coating applied to ⅛" tungsten rods using the processes herein described were successfully cycled 45,000 times between 700° C. and 1450° C. without failure. The thermal cycling rates were of the order of 100° C./sec. on heatup and 200° C./sec. cool down.

As previously mentioned, it is desirable to operate the diodes in an oxidizing atmosphere, or component failure may subject parts of the diode to corrosive atmospheres. The resistance of silicon carbide to oxidation in the temperature range 1100° C.–1400° C. is well known.

Long term static oxidation tests were conducted to determine whether silicon carbide could be used as an oxidation barrier for the protection of refractory metals by direct application. The weight changes of pure silicon carbide and of silicon carbide on graphite were negligible for more than 2000 hours. One sample was exposed for 4,750 hours before failure occurred. The mean time to failure in the most recent test series was more than 750 hours.

From the above detailed description of several preferred embodiments of the present invention, it will be evident that a novel thermionic diode has been described which can be operated at very high temperatures in substantially any atmosphere, and may be positioned directly in a fossil-fuel-flame. The refractory metals, such as tungsten, maintain structural integrity at the elevated temperatures, yet the silicon carbide protective coating provides a barrier against oxidation and is highly resistant to substantially all other modes of corrosion. The interior surfaces, i.e., the emitting surface, of the emitter member that is at the elevated temperatures during operation of the diode are exposed only to the controlled atmosphere of cesium gas and therefore is not subjected to corrosion. The silicon carbide protective coating also provides a barrier against hydrogen permeation which would otherwise contaminate the diode inner space. The integral bond between the silicon carbide protective coating provides a very efficient heat transfer medium to the emitter surface of the emitter member as well as simplifying the structure required to protect the refractory metal or graphite from corrosion. Further, the integral bonding of the silicon carbide to the emitter member greatly simplifies the fabrication process, particularly when the silicon carbide member has structural integrity and provides the support for the vapor-deposited emitter material. This permits emitter surfaces of preferred crystal orientation to be deposited by various conventional techniques. A novel and highly useful process for manufacturing the thermionic diodes has also been described.

Although each of the thermionic diodes described employs a cylindrical outer coat of silicon carbide so that the thermionic diode is merely placed in a flame, it will be appreciated by those skilled in the art, and it is to be understood that within the broader aspects of the invention, the order of layers may be reversed such that a silicon carbide sleeve is surrounded by an emitter which in turn is surrounded by a collector surface. In such a diode, the flame or other heat source would then be contained within the silicon carbide sleeve. It will also be understood that within the broader aspects of the invention, emitter and collector surfaces of substantially any configuration may be employed with the emitter and collector surfaces protected from the oxidizing or other corrosive environment by silicon carbide except in areas where the surfaces must be placed in a controlled atmosphere for the diode to function properly.

Although several preferred embodiments of the present invention have been described in detail, it is to be understood that various substitutions, changes and alterations can be made therein without departing from the spirit and scope of the invention as defined by the appended claims.

What is claimed is:
1. A thermionic diode comprising
   (a) an emitter member comprised of a laminated body having one surface of dense, fluid-impervious silicon carbide and a generally opposite surface of an emitter material having a relatively high work function, said emitter member having a layer of graphite between said silicon carbide and said emitter material, the surfaces of said graphite layer mating with said silicon carbide and said emitter material, and a thermally conductive braze material bonding the mating surface of said emitter material with the graphite,
   (b) a collector member having a relatively low work function disposed adjacent to, but spaced from, the surface of said emitter material, and
   (c) means for controlling the atmosphere between the emitter material and the collector member.
2. The thermionic diode as defined in claim 1 wherein said braze material is an alloy of molybdenum, nickel and manganese.
3. A thermionic diode comprising
   (a) an emitter member comprised of a laminated body having one surface of dense, fluid impervious silicon carbide and a generally opposite surface of an emitter material having a relatively high work function, and having a layer of graphite between said silicon carbide and said emitter material,
   (b) a collector member having a collector surface fabricated of a material having a relatively low work function disposed adjacent to, but spaced from, the surface of said emitter material, and
   (c) means for controlling the atmosphere between the emitter material and the collector member.

References Cited

UNITED STATES PATENTS

| | | | |
|---|---|---|---|
| 2,510,397 | 6/1950 | Hansell | 310—4 |
| 2,917,798 | 12/1959 | Ross | 22—200 |
| 3,099,579 | 6/1963 | Spitzer | 117—230 |
| 3,123,497 | 3/1964 | Barnes | 117—230 |
| 3,166,808 | 1/1965 | Moore | 22—200 |
| 3,196,295 | 7/1965 | Oppen | 310—4 |
| 3,222,755 | 12/1965 | Grass | 29—155.5 |
| 3,222,759 | 12/1965 | MacKenzie | 29—155.5 |
| 3,223,858 | 12/1965 | Martini | 310—4 |

MILTON O. HIRSHFIELD, *Primary Examiner.*

J. W. GIBBS, *Assistant Examiner.*